June 3, 1958  C. M. BREHM  2,837,156
TUBE CUTTING DIE
Filed Feb. 8, 1954  6 Sheets-Sheet 1

INVENTOR
CHARLES M. BREHM
BY Marechal Biebel French & Bugg
ATTORNEYS

June 3, 1958  C. M. BREHM  2,837,156
TUBE CUTTING DIE
Filed Feb. 8, 1954 6 Sheets-Sheet 2

INVENTOR
CHARLES M. BREHM
BY *Marshall Biebel French Bugg*
ATTORNEYS

June 3, 1958  C. M. BREHM  2,837,156
TUBE CUTTING DIE
Filed Feb. 8, 1954  6 Sheets-Sheet 3

INVENTOR
CHARLES M. BREHM
BY Marechal Biebel French & Bugg
ATTORNEYS

June 3, 1958 C. M. BREHM 2,837,156
TUBE CUTTING DIE
Filed Feb. 8, 1954 6 Sheets-Sheet 4

INVENTOR.
CHARLES M. BREHM
BY Marechal Biebel French & Bugg
ATTORNEYS

June 3, 1958 C. M. BREHM 2,837,156
TUBE CUTTING DIE
Filed Feb. 8, 1954 6 Sheets-Sheet 5

INVENTOR
CHARLES M. BREHM
BY *Marechal Biebel French & Bugg*
ATTORNEYS

United States Patent Office 2,837,156
Patented June 3, 1958

2,837,156

TUBE CUTTING DIE

Charles M. Brehm, Springfield, Ohio, assignor, by mesne assignments, to Kelsey-Hayes Company, a corporation of Delaware Application February 8, 1954, Serial No. 408,664

6 Claims. (Cl. 164—40)

This invention relates to apparatus for cutting tubular stock such as metal pipes and other tubing.

The primary object of the invention is to provide apparatus which will quickly and accurately shear tubular stock with minimum loss of material in the cutting operation and with minimum distortion and burr formation, which is operated by fluid pressure, and which is thus readily constructed in simple and compact form for economical operation and maintenance.

Another object is to provide such apparatus constructed for continuous operation in which the stock is fed into cutting position after each cut is completed, and in which the several operating parts are interconnected to cause operation of the shearing mechanism of the apparatus in proper sequential relation with the feeding of the metal.

A further object is to provide fluid pressure operated apparatus for shearing stock wherein the shearing mechanism is caused to execute a plurality of shearing strokes which are substantially transverse to each other and wherein distortion of the stock is minimized by restricting the first stroke to a predetermined limited distance such that the stock is only partially sheared and the stroke portions thereof lying generally lengthwise of the stroke remain integrally connected for shearing during the second stroke.

It is also an object of the invention to provide fluid pressure operated shearing apparatus for tubular stock wherein the effective length of the strokes of the fluid pressure cylinders which operate the shearing mechanism are adjustable in accordance with the thickness of the stock to be cut and give accurate and clean cutting substantially without distortion of the stock over a wide range of stock sizes.

Other objects and advantages of the invention will be apparent from the following description, the accompanying drawings and the appended claims.

Referring to the drawings, which illustrate a preferred embodiment of the invention, the base of the apparatus is shown as formed by a table 20 having supporting legs 21 and braces 22. The main frame of the apparatus is formed by a pair of blocks 24 and 25 which are bolted together at 26 and are secured to a common base plate 27 and side plate 28, the plate 27 being bolted or otherwise secured to the top of table 20. A double-acting hydraulic cylinder 30 is secured to the underside of table 20 by suitable supports indicated at 31, and its piston includes an elongated threaded extension 33. A similar double-acting hydraulic cylinder 35 is mounted in horizontal position on top of table 20 by the supports 36, and it is also secured at 37 to the side plate 28. The piston of cylinder 35 includes a threaded extension 38 similar to the part 33, and the cylinders 30 and 35 are arranged to execute the working strokes of their pistons in respectively vertical and horizontal directions.

Figure 6:
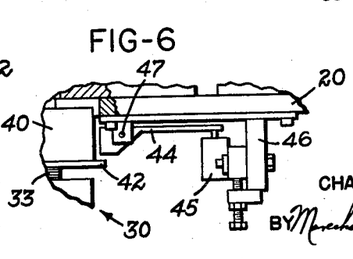
Fig. 6 is an enlarged fragmentary view of Fig. 1 showing the limit switch arrangement for one of the fluid pressure cylinders.
Figure 7:
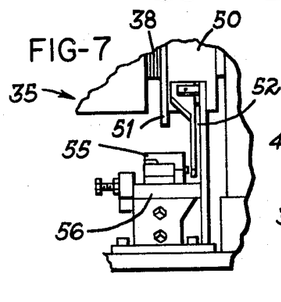
Fig. 7 is a view similar to Fig. 6 showing the limit switch arrangement for the other fluid pressure cylinder.

The piston extension 33 carries a threaded collar 40 which is adapted to abut the underside of the plate 27 in order to provide a positive stop limiting the effective stroke of cylinder 30. The threaded mounting of collar 40 facilitates its adjustment on piston part 33, and it is provided with one or more locking screws 41 to retain it in adjusted position. Referring particularly to Fig. 6, collar 40 is also provided with a flange 42 which is located to engage an operating lever 44 having a limit switch 45 carried by a bracket 46 on the underside of table top 20. The lever 44 is pivotally mounted at 47 to provide an elongated portion thereof adjacent switch 45 for the purpose of magnifying the effective stroke of the cylinder sufficiently to operate switch 45. The piston extension 38 carries a similar threaded collar 50 adjustably mounted thereon and including a flange 51 (Fig. 7) for engaging the pivoted operating lever 52 for a limit switch 55 carried by a bracket 56 mounted below cylinder 35 on the table top.

The main frame members 24 and 25 are formed to enclose a chamber 60 for the cutting mechanism of the apparatus, which includes a pair of carrier members 65 and 66 operated by the two cylinders 30 and 35. The carrier member 65 includes tongue portions 67 and 68 at opposite sides thereof which are guided for lateral sliding movement in guide ways 69 formed by cooperating portions of the frame members 24 and 25, and the tongue portion 67 is connected with a hook-like member 70 secured to the end of the piston extension 38. At the opposite side of the frame, the guide way for the tongue portion 68 is shown as closed by a cover plate 71.

Figure 4:
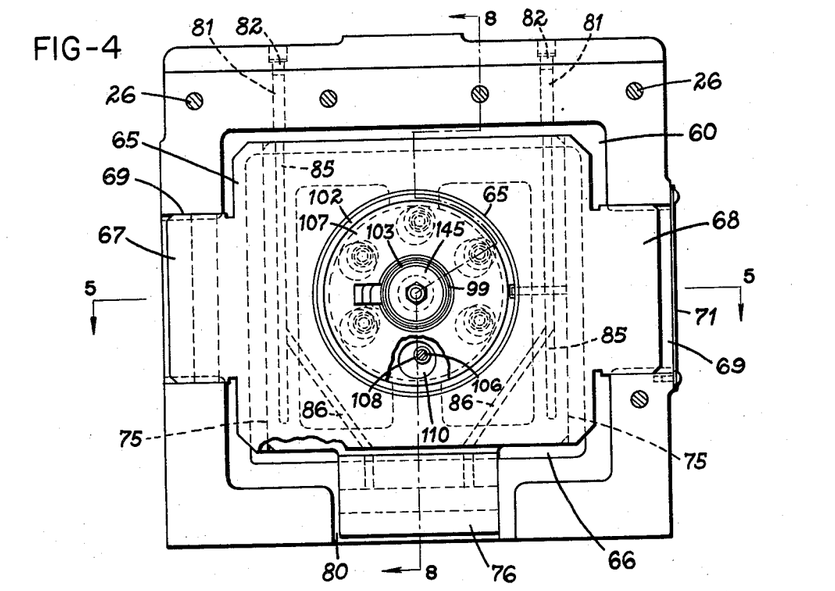
Fig. 4 is an enlarged detail view of the apparatus looking in the same direction as in Fig. 3 and with the front half of the main frame removed.
Figure 5:
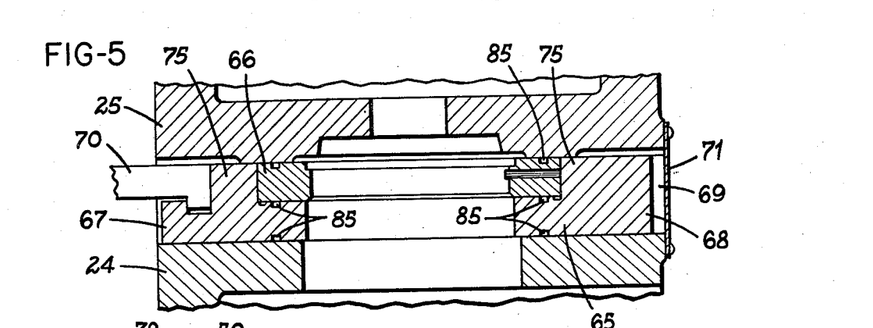
Fig. 5 is a horizontal section through the main frame taken on the line 5—5 of Fig. 4 but with the inner cutters and their supporting mandrel removed.

The carrier member 66 is mounted for vertical sliding movement in carrier member 65 and also for lateral movement with carrier member 65. As shown in Fig. 5, carrier member 65 is formed with a pair of ribs 75 which enclose the two sides of carrier member 66 and cooperate with the inner face of the frame member 25 to confine carrier member 66. A downwardly extending tongue portion 76 on carrier member 66 is connected with a hook portion on a part 77 similar to the part 70 and similarly connected with the piston extension 33 for operation by cylinder 30. As shown in Fig. 4, the tongue portion 76 extends through a passage 80 in the frame member 25 which is sufficiently wider than tongue portion 76 to permit lateral movement of carrier member 66 with carrier member 65. The chamber 60 within which these parts operate is adapted to be filled with lubricant through passages 81 and suitable lubricating fittings 82, and the two carrier members are shown as formed with suitable grooves 85 and ducts 86 to assure proper distribution of lubricant and also to prevent back pressure in the lubricant which might interfere with proper movement of these parts.

The cutting members for the stock comprise two pairs of inner and outer cutters each including an inner punch adapted for insertion within the stock and a continuous annular die adapted to encircle the stock and the punch. In the drawings, the stock is designated as 99, and the two pairs of cutters include a stationary die 100 and punch 101 and a movable die 102 and punch 103. The stationary die 100 is formed with a tapered rearward end which is received within a complementary tapered seat 105 in the inner face of the frame member 25, and die 100 is secured in position by means of elongated bolts 106 cooperating with an end plate 107, bushings 108 and nuts 109. The end plate 107 forms a guide maintaining cutter 102 in a position of properly aligned relationship between its cutting face and the adjacent cutting face of die 100, and the bushings 108 are received within enlarged bores 110 in die 102, the bushings being of sufficiently greater length than the thickness of die 102, for example 0.002 inch, to provide for relative movement of the dies with minimum operating clearance.

The punch 101 is an integral end part of a mandrel or feed rod 111 which supports the stock to be cut, this mandrel being of substantial length, for example two feet or more, and having a plurality of relieved portions 112 along the length thereof for receiving dirt or other foreign matter which may be within the stock. The other end of mandrel 111 is joined to one end of an extension rod 113 of any desired length, for example as much as ten feet, and the other end of the extension rod 113 is supported by a bracket 114 at the far end of a channel 115 or other suitable extension of table 20. The mandrel 111 is of course changed in accordance with the size of the tubing stock to be cut, but the extension rod 113 may conveniently be of relatively small diameter and is fitted with removable collars 116 of different outer diameters matching correspondingly different sizes of mandrels and stock.

It is important to establish adequate rigidity and accurate centering in the supporting structure for the mandrel 111 and the stock thereon. Referring particularly to Figs. 1 and 17–19, the supporting structure includes a pipe 120 mounted on a pair of plates 121 which are in turn secured on the bed 20. A bar 122 is welded along the side of pipe 120 and is provided with multiple tapped holes 123 for receiving mounting bolts 124 for a bracket comprising a vertically arranged bar 125 welded to a horizontally extending plate 126 and provided with bracing members 127.

The forward end of the plate 126 supports a generally H-shaped part 130, which is pivoted by a pin 131 on the end of the plate 126. The forward end of the part 130 carries a pin 132 supporting a bushing or sleeve 133 adapted to form the direct support for the tubing 99 on mandrel 111. The part 130 is adjustable vertically about the pin 131 to establish the precise accurate vertical position of bushing 133 for centering mandrel 111 and the stock thereon with respect to the cutting members. For this purpose, an adjustable stop bolt 135 is mounted in the forward end of the bar 125 and abuts an extension arm 136 on part 130. It will also be noted that the bracket 114 is shown as adjustable as required for initial alignment of the extension rod 113 with the cutting members.

Figure 9:
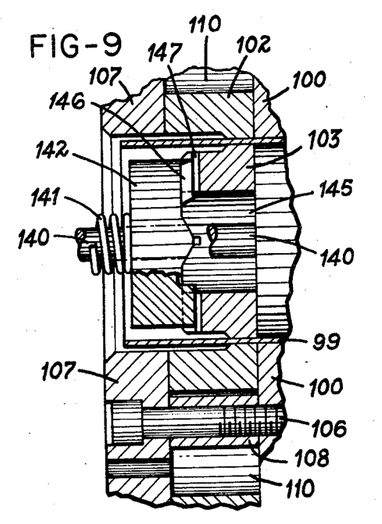
Figs. 9 and 10 are enlarged fragments of Fig. 8 illustrating the movements of the cutting members during the working operation of the apparatus.

The movable punch 103 is mounted on punch 101 by means of an elongated bolt 140 in cooperation with a spring 141 and a pilot member 142. The punch 103 is provided with a large central bore 145 permitting movement of the punch laterally with respect to bolt 140. Ordinarily the two punches will be held in properly aligned relation by the stock as shown in Fig. 9, but if desired, the pilot member 142 may be formed to provide an automatic centering action on the punch 103, as by means of a plurality of relatively flat cam teeth 146 which cooperate with complementarily shaped V-grooves 147 in the outer end face of the punch 103.

Figures 8, 11:
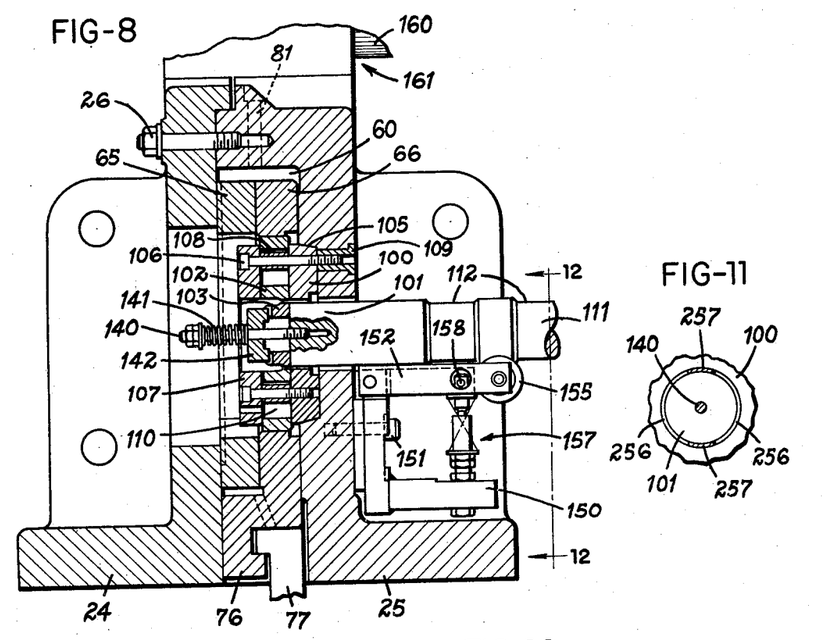
Fig. 8 is a section on the line 8—8 of Fig. 4.
Fig. 11 is a fragmentary section taken approximately on the line 11—11 of Fig. 10 showing the stock at the conclusion of the first cutting stroke of the apparatus.
Figures 12, 13, 14, 15, 16:
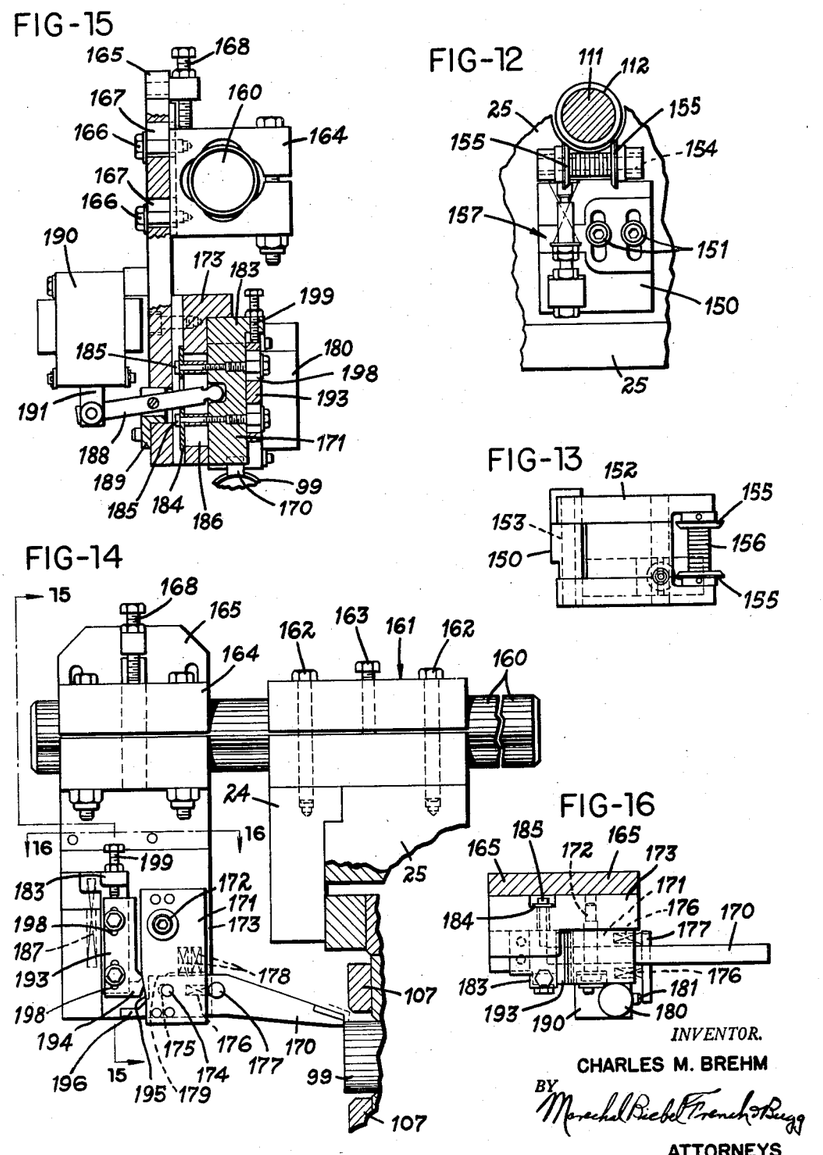
Fig. 12 is a fragmentary section on the line 12—12 of Fig. 8 showing the mechanism which supports the mandrel when there is no stock in the apparatus.
Fig. 13 is a detail plan view of the mechanism of Fig. 12.
Fig. 14 is a detail view in side elevation showing the stop mechanism for locating the stock in cutting position in the apparatus.
Fig. 15 is a section on the line 15—15 of Fig. 14.
Fig. 16 is a section on the line 16—16 of Fig. 14.
Figure 17:
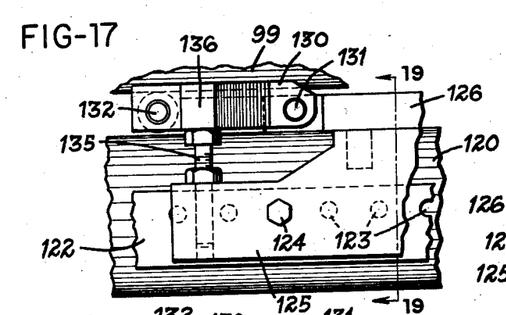
Fig. 17 is a fragmentary view in side elevation showing an adjustable portion of the supporting mechanism for the mandrel.
Figure 18:
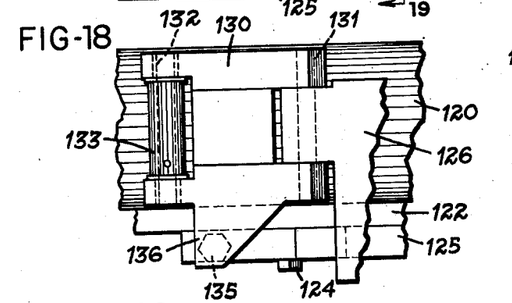
Fig. 18 is a fragmentary plan view of the mechanism of Fig. 19.
Figure 19:
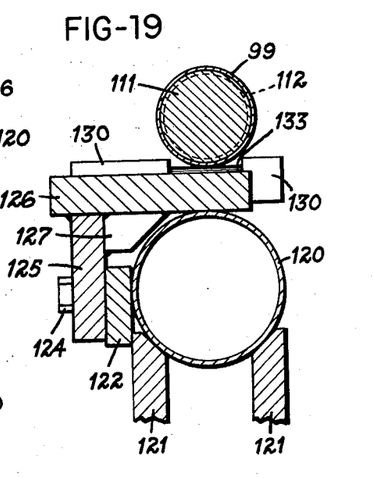
Fig. 19 is a section on the line 19—19 of Fig. 17.

It will be apparent that when stock is in the apparatus, it will inherently cooperate with the punches and dies to maintain the mandrel and punches in properly centered relation with the dies. However, if there is no stock in the apparatus, the mandrel would tend to drop until the punches 101 and 103 rest on their cooperating dies, and in order to prevent this result and to maintain the mandrel centered in the apparatus at all times, an adjustable support is mounted at the back of the block 25 as shown in Figs. 8, 12 and 13. This support includes a bracket 150 adjustably bolted to the back of the block 25 as indicated at 151.

The bracket 150 carries an H-shaped member 152 pivoted thereon at 153 and carrying at its outer end a pin 154 on which is mounted a pair of beveled guide wheels 155. Washers 156 on pin 154 maintain the wheels 155 in the proper axially spaced relation to engage the mandrel 111 when there is no stock thereon. An adjustable spring and stop bolt mechanism 157 is pivoted to the part 152 at 158 and biases the part 152 upwardly to the proper supporting position for the mandrel to maintain the punch 101 in centered relation in the apparatus when there is no stock in the dies as shown in Fig. 8. When the stock is inserted from left to right as viewed in Fig. 8, it will engage the wheels 155 and depress the part 152 against its supporting spring.

Figure 1:
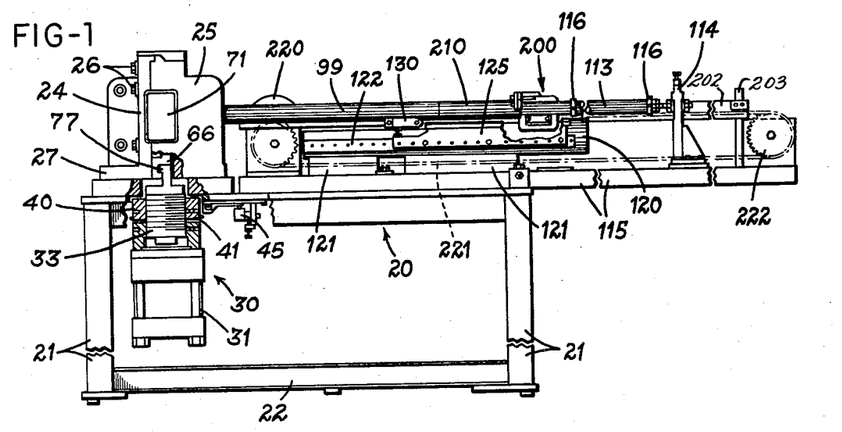
Fig. 1 is a view in side elevation, partly broken away in vertical section, showing the general arrangement of fluid pressure operated tube cutting apparatus constructed in accordance with the invention.
Figure 2:
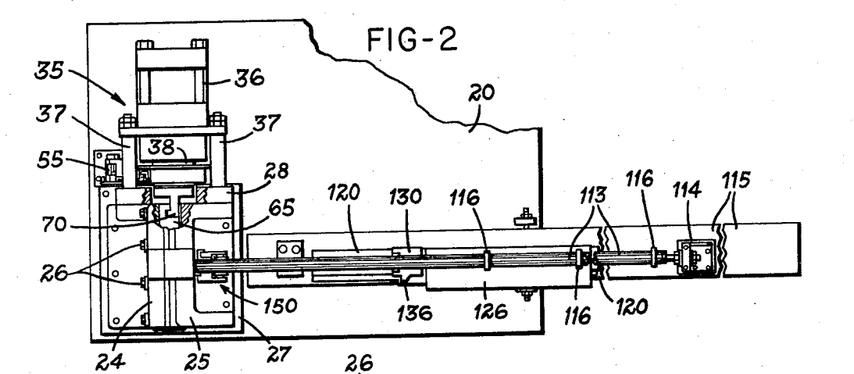
Fig. 2 is a plan view, partly broken away in horizontal section of the apparatus of Fig. 1.
Figure 3:
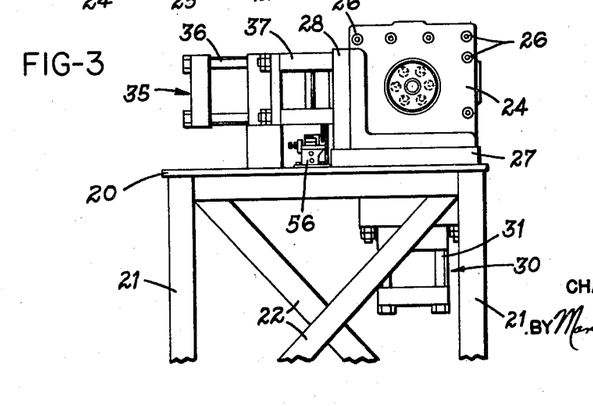
Fig. 3 is a front elevational view of the apparatus of Fig. 1.

Figs. 14–16 illustrate a stop mechanism suitable for use with this apparatus for locating the stock in proper position for cutting, this mechanism being omitted from Figs. 1–3 for improved clarity of illustration. A rod 160 is mounted on the top of the frame blocks by a bracket 161 provided with clamping screws 162 and an opening screw 163. The rod 160 extends in overhanging relation with the front of the apparatus and receives a clamp block 164 on which a bracket plate 165 is mounted for vertical adjustment by the bolts 166 in slots 167 in cooperation with a stop bolt 168 at the top of plate 165.

The lower end of the plate 165 carries the stop mechanism, which includes an elongated finger 170 carried in the forked lower end of a block 171 mounted for limited pivotal movement on a shouldered bolt 172 set in a block 173 which is bolted to the plate 165. The pivot pin 174 for finger 170 is set in block 171 and extends through a slotted hole 175 in finger 170 to provide for both longitudinal and pivotal movement of the finger with respect to block 171. A pair of springs 176 carried by block 171 cooperate with a pin or other shoulder 177 on finger 170 to urge the finger normally to the right as viewed in Figs. 14 and 16 and thus toward the stock in the dies. Additional springs 178 in block 171 bias finger 170 in clockwise direction as viewed in Fig. 14, and this movement is limited by contact of the rearward end of the finger with a shoulder 179 in block 171. The block 171 also carries a limit switch 180, which is omitted from Fig. 14 for clarity of illustration, and its operating button 181 is in position to be engaged for operation by the pin 177 on finger 170 when the finger is at the limit of its travel from right to left as viewed in Figs. 14 and 16 in movement against the springs 176.

The block 173 also carries an L-shaped slide 183 which is mounted for vertical sliding movement by means of a plate 184 operating in a slot in the back of block 173 and connected with slide 183 by bolts 185 provided with suitable spacer bushings operating in a slot 186 in block 173. The slide 183 is normally biased to its uppermost position on block 173 by means of one or more springs 187, and it is movable downwardly against these springs by a lever arm 188 mounted for pivotal movement on a clevis 189 carried by plate 165. One end of the lever 188 extends through the slot 186 and additional aligned slots in plates 165 and 184, and the lever is arranged for movement by a solenoid 190 mounted on the black of plate 165 and having its armature 191 pivoted to lever 188.

The slide 183 carries a cam 193 on its outer side which has a pair of nose-like cam portions 194 cooperating with relieved cam faces 195 on the forked portions of the block 171. The cam 193 is slotted in its lower end to straddle finger 170, and it is formed at its lower end for engagement with an extension 196 at the rearward end of the finger 170. Accurate adjustment of cam 193 on slide 183 is afforded by its slotted mounting 198 on the slide and the adjustable stop bolt 199 carried by the slide in overhanging relation with the upper end of the cam.

In the normal position of the several parts of this stop mechanism in operation, the springs 176 and 178 cooperate to urge finger 170 to a position wherein its forward end is in the path of the stock 99. Feeding movement of the stock will accordingly move this finger against springs 176 to the limit position which is established by the slot 175 in which the finger operates switch 180. At the same time, this movement will also force the block 171 in clockwise direction on bolt 172 into a position of firm engagement between the cam portions 194 and 195, the cam 193 being in its uppermost position with slide 183.

When solenoid 190 is energized, it will act as described through link 188 to move slide 183 and cam 193 downwardly. During the first portion of this travel, the cam noses 194 will slide down the slightly beveled cam faces 195, thereby allowing the block 171 to pivot slightly on bolt 172 and thus to effect a slight freeing of the finger 170 from its previously jammed position against the stock. Continuation of the movement will cause the lower end of cam 193 to engage the extension 196 on finger 170 and thereby to pivot the finger sufficiently to raise its forward end out of contact with the stock. As soon as this occurs, the springs 176 will move the finger forward as permitted by the slot 175 to the position indicated in dotted lines in Fig. 14 in which it is above and in overlapping relation with the stock. This movement of the finger is effected in timed relation with the operation of the apparatus as a whole to move the finger out of the way for a sufficient interval to permit ejection of the cut piece of stock from the apparatus, as described hereinafter in connection with the wiring diagram, and after the cut piece is ejected, springs 178 return the finger to its normal position in the path of the advancing stock.

Figure 20:
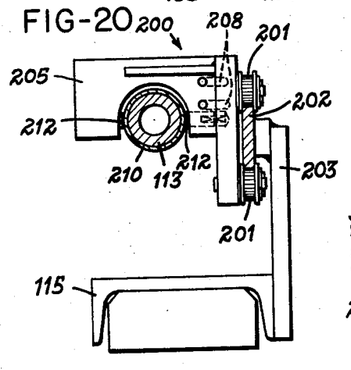
Fig. 20 is a view taken on the line 20—20 of Fig. 21 showing portions of the stock feeding mechanism of the apparatus.
Figure 21:
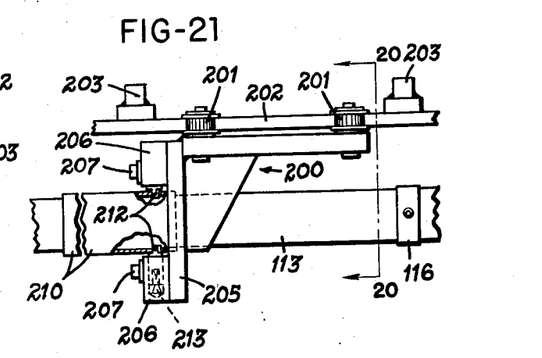
Fig. 21 is a plan view, partly broken away, of the mechanism of Fig. 20.

Figs. 1 and 20–22 illustrate hydraulically operated mechanism for feeding stock along mandrel 111. A carriage 200 is mounted by means of rollers 201 on a rail 202 carried by supports 203 secured at suitably spaced intervals along the channel 115. This carriage includes a yoke portion 205 which overhangs the mandrel 111, and two blocks 206 are secured to yoke 205 for lateral adjustment by means of bolts 207 in cooperating slots 208. A pusher section 210 of tubing, of the same diameter and wall thickness as the stock to be cut, is mounted on mandrel 111, and is coupled with the carriage yoke 205 by means of catch members 212 mounted in the blocks 206 and provided with springs 213, the catch members having ear portions on their outer ends which engage receiving slots in the sides of pusher piece 210 as shown in Figs. 20 and 21.

A reversing switch 215 (Figs. 23 and 24) for the drive motor 220 for carriage 200 is mounted in the path of the carriage, for example by a bracket 216 at the back of the frame member 25 for engagement by a portion of the carriage, and the pusher piece 210 should be of such length with respect to the location of this switch 215 as to eject the last piece of stock from between the cutters in timed relation with the operation of switch 215. The bracket bar 125 should also be adjusted in accordance with the length of pusher piece 210 to locate the sleeve 133 in such position that the pusher piece will not overrun this sleeve in even its most advanced position, since that would allow the mandrel to sag.

Figure 22:
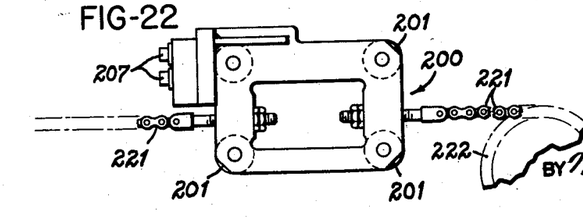
Fig. 22 is a side elevational view of the parts shown in Figs. 20 and 21.
Figure 23:
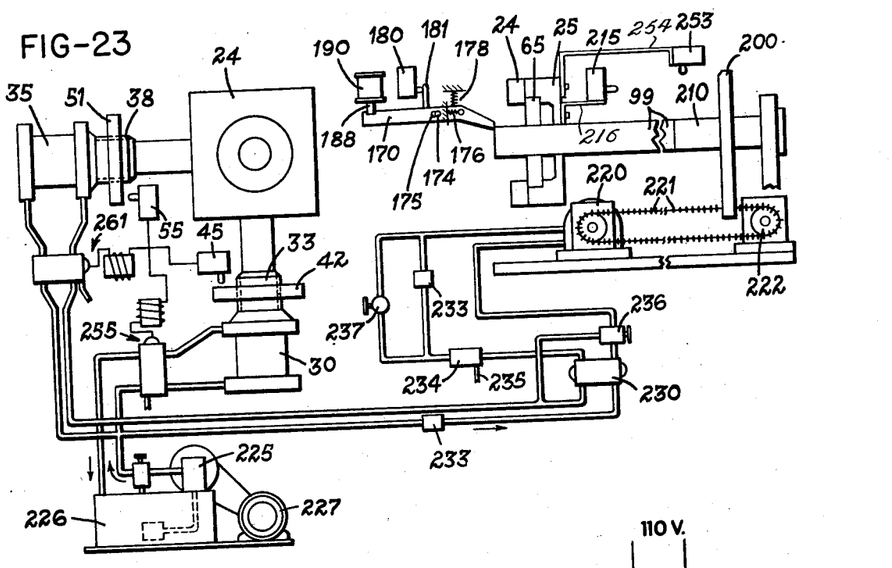
Fig. 23 is a schematic view illustrating diagrammatically the hydraulic system for operating the apparatus.

The carriage 200 is operated by a reversible fluid motor 220 (Fig. 23) through a sprocket chain 221 secured at both ends to the carriage as shown in Fig. 22 and running over an idler sprocket 222 mounted adjacent the rearward end of the extension rod 113. The fluid motor 220 is connected with the complete hydraulic system for the apparatus as shown in Fig. 23, which includes a pump 225 connected with a supply tank 226 of pressure fluid and driven by a motor 227. The pressure fluid supply to the fluid pressure motor 220 is controlled by a four-way valve 230 of the double-solenoid type, and this valve is also shown as having no return springs but is shifted entirely by operation of its solenoids 231 and 232. The pressure lines to the fluid motor include check valves 233, a reducing valve 234 having a drain outlet 235, relief valves 236 and a needle valve 237.

Forward movement of motor 220, to advance the carriage 200 and the stock, is effected by a push button switch 240 controlling a relay 242, and the energizing circuit for the coil of this relay runs through the back contacts of a similar relay 243 having its energizing circuit similarly running through the back contacts of relay 242. Energizing of relay 242 completes the operating circuit for the solenoid 231 of the valve 230 to shift the valve into position to supply pressure fluid to the motor 220 in the proper direction to cause forward movement of the motor 220 and carriage 200, and energizing of relay 242 also breaks the circuit through the back contacts of relay 243 to prevent energizing of relay 243 while relay 242 is energized.

Reverse movement of the motor 220, to retract carriage 200, may be initiated manually by a push button switch 245 which completes the energizing circuit for the relay 243, thus simultaneously breaking the circuit through the back contacts of relay 242 and completing the operating circuit for the solenoid 232 in valve 230 to shift the valve in such direction as to reverse the flow of pressure fluid to the motor 220. With this arrangement, each push button requires only momentary operation, for an interval sufficient to energize the associated valve solenoid and to shift the valve, and thereafter the valve remains in its shifted position until its other solenoid is actuated. The limit switch 215 provides an automatic alternative operating arrangement for reversing relay 243. This switch 215 is normally open and is connected in parallel with switch 245 for operation as already described by a portion of the carriage 200 after the pusher piece 210 has completed ejection of the last piece of stock.

In the normal operation of the apparatus, the power may be controlled by any suitable main starting switch (not shown), and the cutting cycle is initiated alternatively by a manual push button switch 250 or by the limit switch 180 in the stop mechanism. Thus at the start of the operation on a given length of stock, sufficient stock should first be trimmed off to eliminate any burrs or distortions on the end of the stock adjacent the stop finger 170. If the remainder of the stock does not equal a whole number of unit lengths according to the setting of the stop finger, the pusher piece 210 will nevertheless eject the last piece from the apparatus just before operation of reversing switch 215 as descirbed above.

After this initial trimming operation, the cycle is initiated by the feeding movement of the stock into contact with the stop finger 170, which moves back to the limit permitted by slot 175, and in this position the finger closes switch 180 and also stops movement of the stock causing fluid motor 220 to stall. The switches 180 and 250 operate alternatively to energize a control relay 252, the energizing circuit running through the normally closed limit switch 55 and also through a normally closed safety switch 253 positioned for engagement by carriage 200. This switch 253 is mounted in such position with relation to the length of the pusher piece 210 that it will be operated by the carriage after the last piece of stock is cut in order to prevent operation of the cutters during the subsequent forward travel of the carriage necessary to complete ejection of the last piece of stock by the pusher piece 210, and this arrangement is illustrated diagrammatically by the bracket 254 in Fig. 23. The switch 250 is in parallel with switch 180 and may be used in the same manner for manual operation to effect a single action of the cutting members, as when initially trimming the end of a length of stock.

Figure 10:
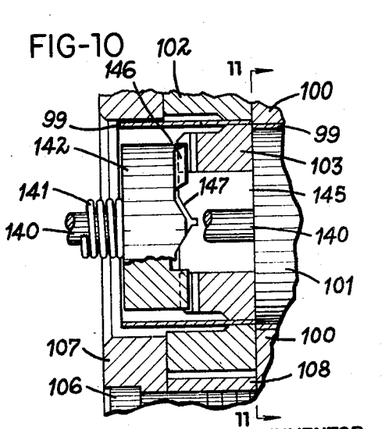

Energizing of relay 252 completes the operating circuit for the solenoid valve 255 which controls the flow of pressure fluid to the cylinder 30 and is shown as of the spring return type. Energizing of this relay also completes a holding circuit for the relay through its other pair of contacts and the switches 180 and 253. When the operating circuit of valve 255 is closed, the valve moves in the direction to admit pressure fluid to the lower end of cylinder 30, which will cause a working stroke of the piston extension 33 to move the carrier member 66 upwards. This stroke is limited, by the setting of collar 40 as described, to a predetermined distance such that only portions along the upper and lower sides of the stock are sheared, while the portions of the stock lying generally length-wise of the shearing stroke remain integrally connected. The result of this stroke is shown in the moved positions of the cutters 102 and 103 in Fig. 10 and in the detail view of Fig. 11 wherein the cut portions of the stock are indicated at 256 and the uncut portions at 257.

When this stroke of the piston in cylinder 30 is completed, the flange 42 on collar 40 operates as described to close the normally open limit switch 45, and this completes the energizing circuit for a relay 260 which closes the operating circuit for the solenoid valve 261 controlling the flow of pressure fluid to the cylinder 35, the valve 261 also being preferably of the spring return type. The valve 261 is accordingly shifted to a position supplying pressure fluid to the outer end of cylinder 35, and the resulting working stroke of the cylinder is effective to move carrier member 65 laterally in the main frame, carrying with it the movable cutters to complete the shearing of the stock.

When the stroke of the piston in cylinder 35 is completed, the flange 51 on the collar 50 operates the normally closed limit switch 55 to open the holding circuit for relay 252, thus causing valve 255 to shift and to reverse the supply of pressure fluid to cylinder 30 and cause retraction of its piston. As soon as the piston extension 33 starts to retract, the collar 40 moves away from limit switch 45, thus opening the energizing circuit for relay 260 and similarly causing valve 261 to shift and reverse the flow of pressure fluid to cylinder 35 to cause retraction of its piston. The cycle of the machine is thus completed by retraction of the two pistons, which action causes the movable pair of cutters 102 and 103 to return to centered relation with the other cutters and the stock.

Figure 24:
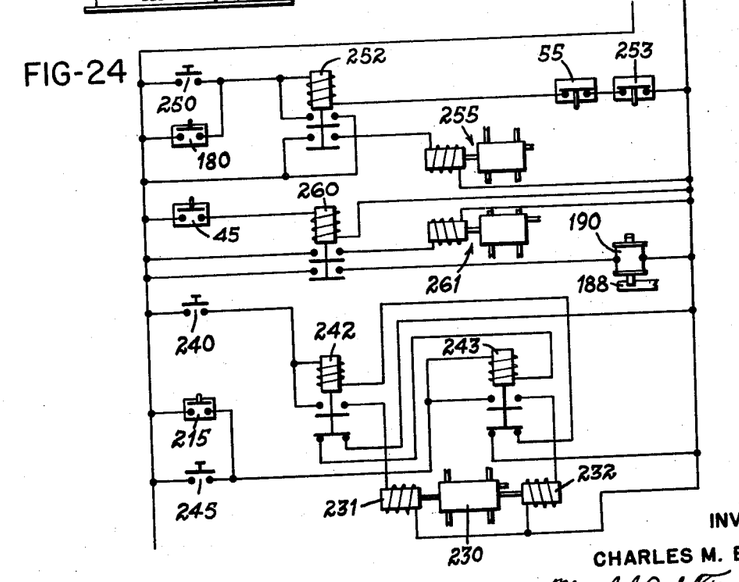
Fig. 24 is a wiring diagram.

Fig. 24 shows the operating circuit for the solenoid 190 as connected through the other pair of contacts in the relay 260, and with this arrangement, energizing of relay 260 will energize solenoid 190 causing the latter to shift stop finger 170 as described out of contact with the piece of stock being cut. The finger therefore again moves forward past the end of the stock as indicated in dotted lines in Fig. 14, and while this movement causes switch 180 to open, the relay 252 remains closed by reason of the holding circuit therethrough. However, although this movement of the finger terminates its stopping action on the stock, the latter is unable to advance until completion of the cutting cycle by reason of the fact that it is held in the cutters through engagement of the cutting faces of the movable cutters with the cut portions 257 of stock. After the cutters are returned to their centered positions at the end of the cycle as described, this resistance to the feeding movement of the stock and motor 220 is removed, and the stock moves forward.

During the first movement of the stock, the cut piece will be ejected from the cutters and will fall, thus permitting stop finger 170 to be returned to its stop position by the springs 178, and the next cutting cycle is therefore initiated by engagement of the stock with this finger and the resulting movement of the finger to close switch 180. It will accordingly be seen that operation of this apparatus will be automatic after the first cutting operation has been initiated by the push button switch 250 or the limit switch 180. During each cutting operation, the feed motor 220 stalls until the cutters are again centered in such position that feeding of the stock can continue, and the successive pieces will be cut off in the length determined by the spacing between the cutting plane of the cutters and the back position of the stop finger 170. When the last cut in a length of stock has been made, the subsequent feeding movement of carriage 200 will first result in opening the limit switch 253 so as to deenergize relay 252 and prevent further operation of the cutters, but in order to eject the last piece of stock, the carriage will continue to feed forward until it engages and closes the reversing limit switch 215. When this occurs, the feed motor is reversed and returns the carriage to the rearward end of mandrel 111, this movement being terminated by engagement of the carriage with the bracket 114 causing the motor 220 to stall again until it is reversed by means of switch 250 after a new piece of stock has been loaded into the apparatus.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Apparatus of the character described for cutting tubular stock comprising a frame, two pairs of inner and outer cutters each including an inner punch adapted for insertion within said stock and a continuous annular die adapted to encircle said stock and said punch, means supporting said pairs of cutters for relative shearing movement transversely of said stock, means for operating said cutters in desired sequence to execute a pair of shearing strokes substantially perpendicular to each other, means for continuously feeding said stock, stop means in the path of said stock to limit the feeding movement thereof to a predetermined distance, means operated by engagement of said stock with said stop means for actuating said operating means for said cutters, and means operated by said cutter operating means for temporarily releasing said stop means upon completion of said shearing strokes to provide for automatic continuous sequential operation of said apparatus.

2. Apparatus of the character described for cutting tubular stock comprising a frame, two pairs of inner and outer cutters each including an inner punch adapted for insertion within said stock and a continuous annular die adapted to encircle said stock and said punch, means supporting said pairs of cutters for relative shearing movement transversely of said stock, means for operating said cutters in desired sequence to execute a pair of shearing strokes substantially perpendicular to each other, fluid pressure means for continuously feeding said stock, stop means normally positioned in the path of said stock for limiting feeding movement of said stock to a predetermined distance, means for shifting said stop means out of the path of said stock, means operated by engagement of said stock with said stop means for actuating said cutter operating means, and means operated by said cutter operating means for temporarily actuating said stop shifting means upon completion of said shearing strokes to effect ejection of the cut section of said stock and thereby to cause renewed feeding of said stock for continuous sequential operation of said apparatus.

3. Apparatus of the character described for cutting tubular stock comprising a frame, two pairs of inner and outer cutters each including an inner punch adapted for insertion within said stock and a continuous annular die adapted to encircle said stock and said punch, means supporting said pairs of cutters for relative shearing movement transversely of said stock, means for operating said cutters in desired sequence to execute a pair of shearing strokes substantially perpendicular to each other, a mandrel for supporting said stock for feeding movement to said cutters, a carriage including a portion slidable on said mandrel and adapted to abut the trailing end of said stock, means including a fluid pressure motor for continuously urging said carriage in the direction to advance said stock on said mandrel, stop means normally positioned in the path of said stock for limiting feeding movement of said stock to a predetermined distance, means for shifting said stop means out of the path of said stock, means operated by engagement of said stock with said stop means for actuating said cutter operating means, means operated by said cutter operating means for temporarily actuating said stop shifting means upon completion of said shearing strokes to effect ejection of the cut section of said stock and thereby to cause renewed feeding of said stock for continuous sequential operation of said apparatus, and means including a switch positioned in the path of said carriage for engagement by said carriage when substantially all of said stock has been cut for reversing the direction of operation of said motor to withdraw said carriage to the opposite end of said mandrel from said cutters.

4. Apparatus of the character described for cutting tubular stock comprising a frame, two pairs of inner and outer cutters each including an inner punch adapted for insertion within said stock and a continuous annular die adapted to encircle said stock and said punch, means supporting said pairs of cutters for relative shearing movement transversely of said stock, a pair of double acting fluid pressure cylinders secured to said frame in substantially perpendicular relation and having pistons therein, means connecting said pistons with one said pair of cutters to cause a pair of shearing strokes thereof substantially perpendicular to each other upon operation of said cylinders, means for supplying pressure fluid to one said cylinder in the direction to cause a shearing stroke of said pair of cutters, means for restricting said stroke to a predetermined limited distance such that said stock is sheared only at opposite side portions thereof leaving integrally connected the portions of said stock lying generally lengthwise of said stroke, means actuated by a moving part of said apparatus upon the completion of said stroke for supplying pressure fluid to the other said cylinder in the direction to cause a second shearing stroke of said cutters to complete the shearing of said stock, means actuated by a moving part of said apparatus upon the completion of said second stroke for reversing the supply of pressure fluid to the first said cylinder to cause retraction of the piston therein, and means actuated by retraction of said piston for reversing the supply of pressure fluid to the second said cylinder to cause retraction of the piston therein.

5. Apparatus of the character described for cutting tubular stock comprising a frame, two pairs of inner and outer cutters each including an inner punch adapted for insertion within said stock and a continuous annular die adapted to encircle said stock and said punch, means supporting said pairs of cutters in closely adjacent relation axially of said stock, fluid pressure means carried by said frame and operatively connected with one of said pairs of cutters to cause shearing movement of said pairs of cutters in a predetermined direction substantially transverse of the axis of said stock upon application of fluid pressure to said pressure means to execute a working stroke, means restricting said movement of said cutters to a predetermined limited distance to effect only partial shearing of the entire circumference of said stock in opposite side portions thereof while leaving said stock in the portions thereof lying generally lengthwise of said movement, additional fluid pressure means operatively connected with said one pair of cutters to cause shearing movement thereof in a direction substantially transverse of the direction of the first said shearing movement upon application of fluid pressure to said additional pressure means to complete the shearing of said stock, means for continuously feeding said stock axially through said cutters, stop means in the path of said stock to limit the feeding movement thereof to a predetermined distance, means actuated by engagement of said stock with said stop means for supplying pressure fluid to both said pressure means in predetermined sequence to effect said working strokes thereof, and means responsive to said operation of said cutters for temporarily releasing said stop means upon completion of said shearing movements to provide for automatic continuous sequential operation of said apparatus.

6. Apparatus of the character described for cutting tubular stock comprising a frame, two pairs of inner and outer cutters each including an inner punch adapted for insertion within said stock and a continuous annular die adapted to encircle said stock and said punch, means supporting said pairs of cutters in closely adjacent relation axially of said stock, a first hydraulic cylinder carried by said frame and operatively connected with one of said pairs of cutters to cause shearing movement of said pair of cutters in a predetermined direction substantially transverse of the axis of said stock upon application of hydraulic fluid to said cylinder to execute a working stroke, means restricting said movement of said cutters to a predetermined limited distance to effect only partial shearing of the entire circumference of said stock in opposite side portions thereof while leaving said stock in the portions thereof lying generally lengthwise of said movement, a second hydraulic cylinder operatively connected with said one pair of cutters to cause shearing movement thereof in a direction substantially transverse of the direction of the first said shearing movement upon application of hydraulic fluid to said second cylinder to complete the shearing of said stock, means including a hydraulic motor for feeding said stock axially through said cutters, means for continuously supplying hydraulic fluid to said motor, stop means in the path of said stock to limit the feeding movement thereof to a predetermined distance, means actuated by engagement of said stock with said stop means for supplying hydraulic fluid to both said cylinders in predetermined sequence to effect said working strokes thereof, and means responsive to said operation of said cutters for temporarily releasing said stop means upon completion of said shearing movements to provide for automatic continuous sequential operation of said apparatus.

References Cited in the file of this patent

UNITED STATES PATENTS

| | | |
|---|---|---|
| 984,887 | Briede | Feb. 21, 1911 |
| 1,901,067 | Vickers | Mar. 14, 1933 |
| 2,333,158 | Dowd | Nov. 2, 1943 |
| 2,435,469 | Roop | Feb. 3, 1948 |
| 2,627,921 | Brehm | Feb. 10, 1953 |